United States Patent
Heinen et al.

(10) Patent No.: US 6,741,865 B1
(45) Date of Patent: May 25, 2004

(54) DIGITAL MULTI-SUBSCRIBER RADIO TELECOMMUNICATION SYSTEM WORKING WITH FREQUENCY JUMPING

(75) Inventors: Stefan Heinen, Krefeld (DE); Stefan Beyer, Mering (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/674,630

(22) PCT Filed: Mar. 15, 1999

(86) PCT No.: PCT/DE99/00708

§ 371 (c)(1),
(2), (4) Date: Jan. 16, 2001

(87) PCT Pub. No.: WO99/56411

PCT Pub. Date: Nov. 4, 1999

(30) Foreign Application Priority Data

Apr. 29, 1998 (DE) .......................................... 198 19 213

(51) Int. Cl.[7] .................................................. H04Q 7/20
(52) U.S. Cl. .................... 455/465; 455/550.1; 370/347; 370/442; 370/458; 370/478
(58) Field of Search ............................. 455/74.1, 422.1, 455/426.1, 455, 462, 465, 516, 550.1; 370/229, 337, 347, 436, 442, 458, 478; 375/130, 131, 132, 133

(56) References Cited

U.S. PATENT DOCUMENTS

| | | | | |
|---|---|---|---|---|
| 5,212,684 A | * | 5/1993 | MacNamee et al. | ........ 370/280 |
| 5,227,672 A | * | 7/1993 | Sawtell | ........ 327/141 |
| 5,491,832 A | * | 2/1996 | Malkamaki et al. | ..... 455/552.1 |

(List continued on next page.)

FOREIGN PATENT DOCUMENTS

| | | |
|---|---|---|
| EP | 0 594 354 A2 | 4/1994 |
| EP | 0 670 640 A2 | 9/1995 |
| EP | 0 767 551 A2 | 4/1997 |
| WO | WO 99/09679 | 2/1999 |

OTHER PUBLICATIONS

Simon Atkinson et al.: "Architekturen für ein Dect–Sende– und Empgangsteil: Ein Vergleich" [architectures for a Dect transmitter and receiver unit; a comparison], *ntz*, vol. 46, 1993, No. 10, pp. 754–757.

David Manela et al.: "Wireless Audio And Data Using Frequency Hopping At 2.4 GHz", *Microwave Journal*, Jan. 1997, pp. 100–116.

Ulrich Pilger: "Struktur des DECT–Standards" [structure of the DECT standard], *Nachrichtentech., Elektron.*, Berlin, vol. 42, No. 1, 1992, pp. 23–29.

(List continued on next page.)

*Primary Examiner*—William Trost
*Assistant Examiner*—James D Ewart
(74) *Attorney, Agent, or Firm*—Laurence A. Greenberg; Werner H. Stemer; Gregory L. Mayback

(57) ABSTRACT

In the digital multi-subscriber radio telecommunication system which operates using frequency hopping technology and is intended for use in the 2.4 GHz ISM (Industrial Scientific and Medical) frequency band, in which a 20 dB channel bandwidth of a maximum of 1 MHz is prescribed, the known, DECT radio system operating using TDMA/FDMA technology is matched, in RF terms, to the ISM band and is modified such that the data transfer rate is reduced, preferably halved, by comparison with the data transfer rate of 1152 kbit/s, which is prescribed as standard for DECT. The system according to the invention can be used in cordless telephones.

19 Claims, 2 Drawing Sheets

U.S. PATENT DOCUMENTS

| | | | | |
|---|---|---|---|---|
| 5,896,211 A | * | 4/1999 | Watanabe | 398/76 |
| 6,005,884 A | * | 12/1999 | Cook et al. | 375/132 |
| 6,185,691 B1 | * | 2/2001 | Gandhi et al. | 713/500 |
| 6,275,506 B1 | * | 8/2001 | Fazel et al. | 370/478 |
| 6,393,007 B1 | * | 5/2002 | Haartsen | 370/337 |
| 6,434,183 B1 | * | 8/2002 | Kockmann et al. | 375/132 |

OTHER PUBLICATIONS

Stefan Heinen et al.: "A 2.7V 2.5 GHz Bipolar Chipset for Digital Wireless Communication", *1997 IEEE International Solid–State Circuits Conference*, pp. 306–307, XP–000753110.

* cited by examiner

DIGITAL MULTI-SUBSCRIBER RADIO TELECOMMUNICATION SYSTEM WORKING WITH FREQUENCY JUMPING

BACKGROUND OF THE INVENTION

Field of the Invention

The invention relates to a digital multi-subscriber radio telecommunication system which operates using frequency hopping technology and is intended for use in the 2.4 GHz ISM (Industrial Scientific and Medical) frequency band, in which a 20 dB channel bandwidth of a maximum of 1 MHz is prescribed and rust be adhered to.

The ISM frequency band from 2400 MHz to 2485 MHz is available worldwide for industrial, scientific and medical purposes. This UHF frequency band car be used to provide radio services, that is to say including cordless telephones. However, in particular, exactly prescribed conditions must be adhered to for radio operation in this frequency band.

If a digital multi-subscriber radio telecommunication system operating using frequency hopping technology is to be produced in this 2.4 GHz ISM band, then it is a significant feature that a 20 dB bandwidth of a maximum of 1 MHz is prescribed for this purpose and must be strictly adhered to; this is known to be exceeded in the case of the DECT standard.

A digital multi-subscriber radio telecommunication system which operates using frequency hopping technology and is intended for use in the 2.4 GHz ISM (Industrial Scientific and Medical) frequency band is nor known to date. For the WLAN standard IEEE 802.11, a data transfer rate of 1 Mbit/s is stipulated for GFSK (Gaussian Frequency Shift Keying) modulation. However, this results in markedly higher demands on accuracy for the modulation deviation in the radio-frequency part of the radio sets and hence in a much higher technical and hence cost outlay than in DECT units, for example.

SUMMARY OF THE INVENTION

The object of the invention is to provide, for the 2.4 GHz ISM frequency band, a digital multi-subscriber radio telecommunication system which operates using frequency hopping technology and is based on an already widespread radio system of this type, so that only relatively small alterations are required in the units used for this system when used as desired in the ISM band, and the extent of the alterations in the digital modules is so small that said modules can be incorporated in the units of the radio system which is already used without any significant additional technical and hence cost outlay.

In accordance with the invention, which is based on a digital multi-subscriber radio telecommunication system of the type mentioned in the introduction, this object is achieved by a modification to the known DECT (Digital European Cordless Telecommunications) radio system, which operates using TCM. (Time Division Multiple Access)/FDMA (Frequency Division Multiple Access) technology, such that the data transfer rate is reduced by comparison with the data transfer rate of 1152 kbit/s which is prescribed as standard for DECT, and that there is provision for the radio-frequency parts of the units used in the system to be matched to the ISM frequency band, which is altered by comparison with the DECT standard.

The invention thus provides a frequency hopping system in the 2.4 GHz ISM band. It has been recognized that the DECT system is frame duration of 10 ms means that the system is capable of making the required frequency changes, where a frequency should He maintained for a maximum of 0.4 s in 30 s.

Expedient embodiments, developments and one possible se for the system according to the invention are specified in the dependent claims.

According to one advantageous embodiment of the invention, the data transfer rate is reduced to half the data transfer rate prescribed in the DUCT standard, that is to say is reduced from 1152 kbit/s to 576 kbit/s. In this case, two time slots are expediently combined in order to maintain the net data transfer rate. The channel spacing is expediently likewise reduced to half the DECT channel spacing, that is to say is reduced from 1532 kHz to 864 kHz.

The Frequencies can thus be readily generated from a standard DECT system clock. In the radio-frequency part of the units used, only one new IF filter with half the bandwidth is required in addition to the front end's being matched to the new frequency range.

In principle, a reduction to another fraction of the DECT data transfer rate, e.g. to ⅔ or ¾ of the DECT data transfer rave, with another channel spacing is also possible. However, this may result in additional outlay by comparison with the reduction to half the DECT data transfer rate and to half the DECT channel spacing.

An illustrative embodiment of a subscriber unit for the digital multi-subscriber radio telecommunication system for use in the 2.4 GHz ISM frequency band is explained below and is shown in the drawings.

DESCRIPTION OF THE PREFERRED EMBODIMENTS

Figure 1:
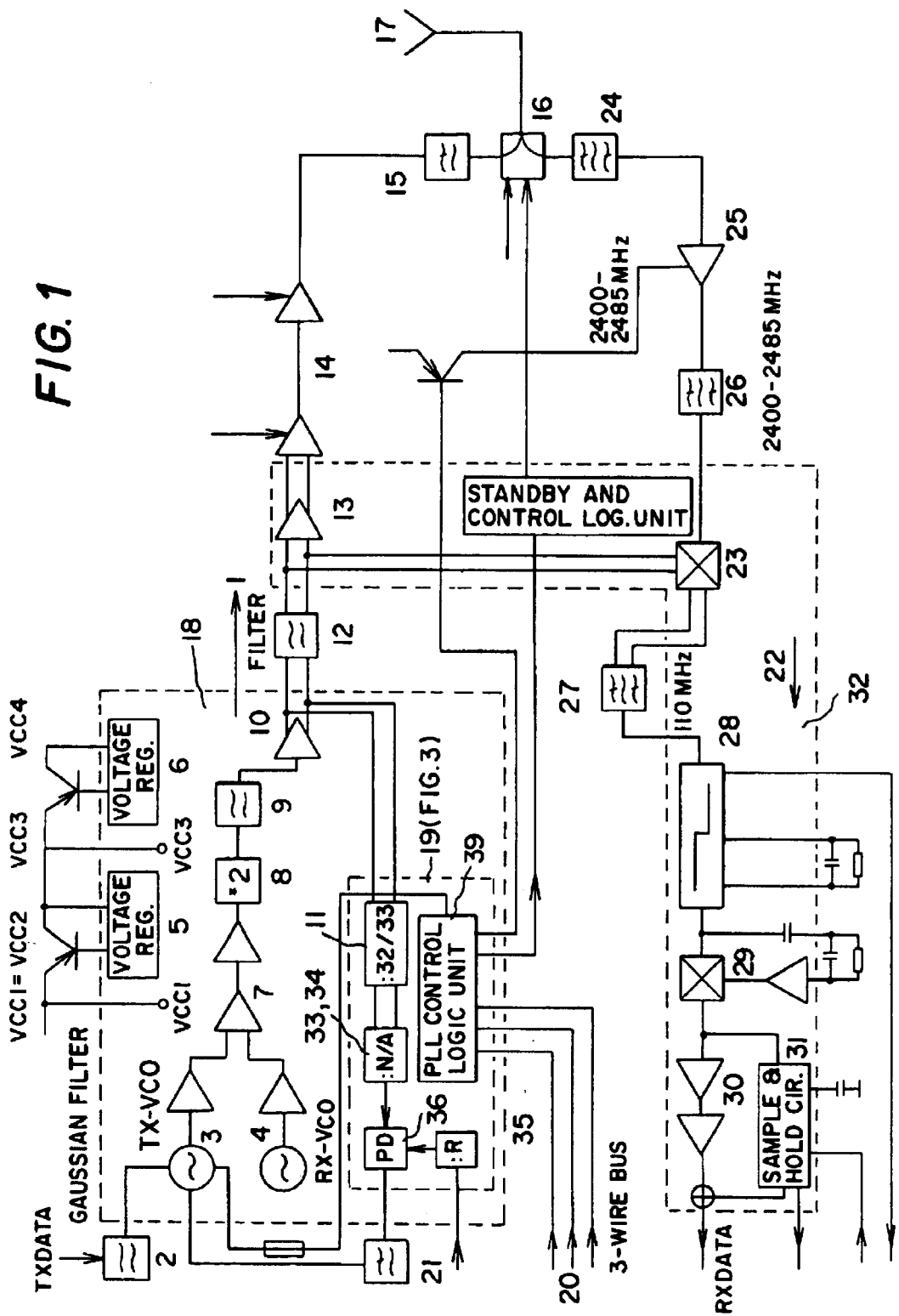
FIG. 1 shows an entire block diagram of the transceiver unit for a subscriber.

The transmission path 1 of the highly integrated transceiver shown in FIG. 1 for the ISM band contains modules used in DECT units and operates using open-loop modulation, to which end the digital signal TXDATA which is to be transmitted is supplied via a Gaussian filter 2 to a voltage-controlled oscillator (VCO) 3 for the transmission mode, which has Win associated second voltage-controlled oscillator 4 for the reception mode. Also integrated are two voltage regulators 5 and 6 for setting the supply voltages of the analogue RF part or of the voltage-controlled oscillators 3 and 4.

The voltage-controlled oscillators 3 and 4 generate differential signals, the signals from the active oscillator 3 or 4 being input into a frequency doubler 8 via isolating amplifiers 7, and then also into a prescaler 11 in a PLL frequency synthesizer 19 in the path via a filter 9 and an amplifier 10.

The output signal from the amplifier 10 is supplied in the transmission path 1 via a printed filter 12, a preamplifier 13, power amplifier 14 and a low-pass filter 15 to the transmission input of a duplexer switch 16, whose antenna connection has an antenna 17 connected to it which is jointly us;ed for transmission and reception.

The desired output signal in the ISM band is thus produced in the path via a frequency doubler 8, so that the voltage-controlled oscillators 3 and 4 can be operated at half the output frequency, which means that a higher level of isolation is attained for the open-loop modulation An important component part of the integrated circuit called the transmission part chip 18 is the integrated PLL frequency synthesizer 19, which can be programmed using a 3-wire bus interface 20 and can be set by the prescaler 11 and also by an arithmetic and logic unit with counters in the division ratios. Furthermore, the 3-wire bus interface 20 is used to control all chip functions, that is to say the various modes of operation, for example; in particular, the PLL arithmetic and logic unit and the mode of the voltage-controlled oscillators 3 and 4 are Controlled.

The operation of the PLL frequency synthesizer 19 also includes the loop low-pass filter 21, which is not directly jointly integrated in the transmission part chip 18. The number of interface wires to a baseband control device is thus kept at a minimum.

The PLL frequency synthesizer 19 is explained in more detail later in conjunction with FIGS. 2 and 3. The frequency doubling (carried out in the frequency doubler 8) of the output signal from the active differential voltage-controlled oscillator 3 or 4 is performed by multiplying the signal by its quadrature component.

An input of a down-converter 23 is connected via a first ceramic bandpass filter 24, a low-noise amplifier 25 and a second ceramic bandpass filter 26 to the receiver connection of the duplexer switch 16 in a transceiver reception path 22. The two bandpass filters 24 and 26 are designed to let through the ISM frequency band from 2400 MHz to 2485 MHz. The other input of the down-converter 23 is supplied with a signal which is output from the transmission path I and is derived by the voltage-controlled oscillator 4 for the reception mode.

The output signal taken from the down-converter 23 is passed via an IF filter 27 and a limiter 28, is then demodulated in analogue form in a demodulator 29 and is subsequently subjected to analogue/digital conversion using amplifiers 30 and a sample and hold circuit 31, so that a digital data signal RXDATA which has been is available. A large part of the reception path 22 is integrated in a reception part chip 32.

The unit design originally provided for DECT has thus been altered in the radio-frequency part, whose front end is matched to the ISM frequency range, which is different from that for DECT, and in the IF filter 27, for which half the DECT bandwidth is required. In addition, there are then also alterations, described in detail, in the PLL division ratios of the transmission part chip as a result of a modification to the counters in the arithmetic and logic unit for the PLL frequency synthesizer 19.

Figure 2:
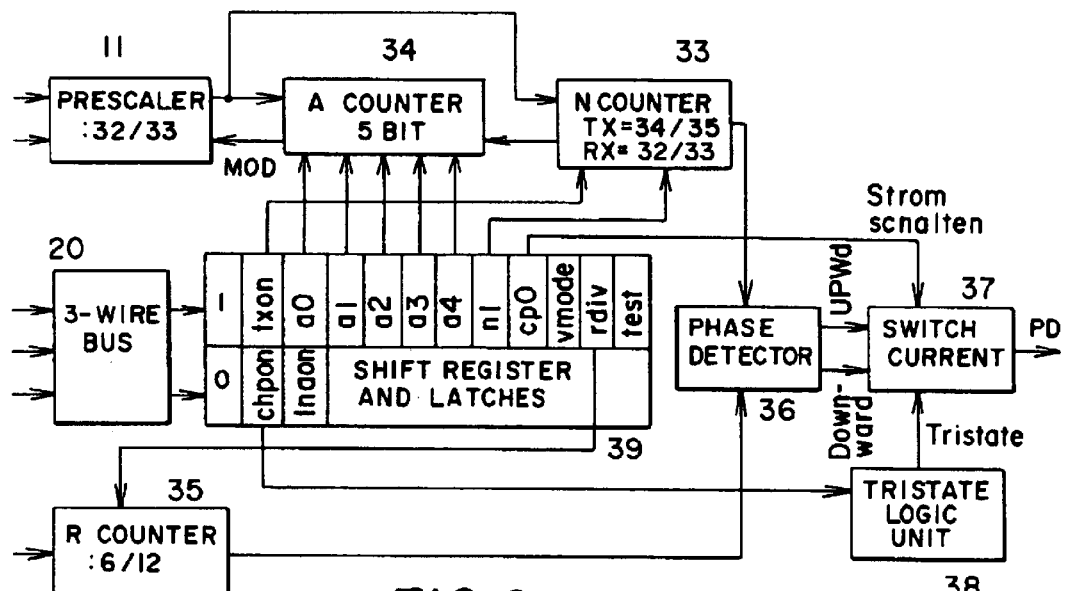
FIG. 2 shows the block diagram of a PLL frequency synthesizer used in DECT units.
Figure 3:
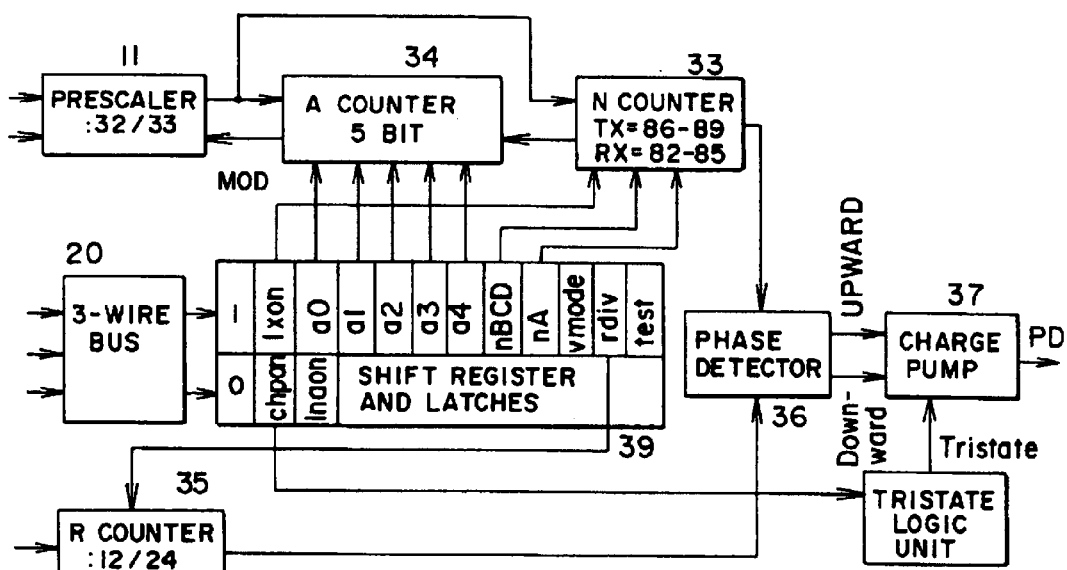
FIG. 3 shows the block diagram of a PLL frequency synthesizer altered for use in ISM units.

FIG. 2 shows a PLL frequency synthesizer which is already used for DECT transceiver units and is contained together with other functional groups in the transmission part chip 18, It contains the prescaler 11, an N counter 33, an A counter 34, an R counter 35, a phase detector 36, a charge pump 37, a tristate logic unit 38 and a PLL control logic unit 39. The prescaler 11 and the counters form an arithmetic and logic unit which defines the PLL division ratios.

In DECT mode, the N counter 33 can be changed over between 34/35 in transmission mode and 32/33 in reception mode. The R counter 35 an be changed over between 6 and 12 in order to permit a system clock of 10368 MHz and 20376 MHz, respectively. The PLL frequency synthesizer 19 is able to address the DECT nominal channels given by $f_e=f_0-c\cdot 1728$ kHz, where $f_0 1897.344$ MHz and c=10, 9, 8, ..., –53.

Hence, all the DECT nominal channels in the frequency band from 1880 MHz to 1990 MHz can be addressed by the slowly hopping frequency synthesizer (c=9, ..., 0). The intermediate frequency is assumed to be 110.592 MHz. This gives an N counter value of 34/35 in transmission mode and of 32/33 in reception mode.

The phase detector 35 is phase- and frequency-sensitive. The prescaler 11 divides the signal frequency of the doubled output signal from the deactivated voltage-controlled oscillator 3 or 4 using a ratio of 1:32 or 1:33. The division ratio is controlled by means of the PLL control logic unit 39.

The PLL frequency synthesizer for the ISM band (shown in FIG. 3) is modified in a few places by comparison with the PLL frequency synthesizer for DECT (shown in FIG. 2). The modified circuit blocks in the transmission part chip 18 in FIG. 1 are shown with a bold border in FIGS. 2 and 3.

The N counter 33 can be changed cover between 86–89 and 82–85, in each case based on the transmission mode or on the reception mode. The R counter 35 can be changed over between 12 and 24 in order to permit a system clock of either 10368 MHz or 20736 MHz. The PLL Ti frequency synthesizer is able to address the ISM nominal channels given by $f_e=f_0+c\cdot 864$ kHz, where $f_0 2377.728$ MHz and c=0, 1, 2, ..., 127.

Hence, all ISM nominal channels in the frequency band from 2400 MHz to 2485 MHz can be addressed by a slowly hopping synthesizer (c =27, ..., 121). The intermediate frequency is assumed to be 110.592 MHz, as in the DECT system. This gives an N counter value, for the ISM band, of 86–89 in transmission mode and of 82–85 in reception mode.

What is claimed is:

1. A modified Digital European Cordless Telecommunications (DECT) system configured to operate using Time Division Multiple Access/Frequency Division Multiple Access (TDMA/FDMA) technology in the 2.4 GHz Industrial Scientific and Medical (ISM) frequency band, the system comprising:

a 20 dB communication channel having a maximum bandwidth of 1 MHz; and radio-frequency (RF) units, said RF units each matched to the ISM frequency band and configured to selectively communicate with others of said RF units via said communication channel, said RF units having a reduced data transfer rate of about 576 kbit/s being half of a prescribed DECT data transfer rate of about 1152 kbit/s, said RF units having a reduced channel separation reduced from a DECT channel separation of about 1728 kHz.

2. The modified DECT system according to claim 1, wherein a channel separation is likewise appropriately reduced by comparison with a prescribed DECT channel separation of 1728 kHz.

3. The modified DECT system according to claim 1, wherein time slots are combined to maintain a net data transfer rate.

4. The modified DECT system according to claim 1, wherein a channel separation is reduced from a prescribed DECT channel separation of 1728 kHz to 864 kHz.

5. The modified DECT system according to claim 1, wherein two time slots are combined to maintain a net data transfer rate.

6. The modified DECT system according to claim 1, wherein said RF units utilize transmitter modules and receiver modules provided for a conventional DECT system, and some of said modules are matched to the frequencies modified in comparison with the DECT standard.

7. The modified DECT system according to claim 6, wherein the modified frequencies are generated from a standard DECT system clock.

8. The modified DECT system according to claim 6, which comprises a radio-frequency (RF) part provided for use in DECT units and wherein, besides a matching of a front end to the frequency range of the ISM band, altered by comparison with the DECT standard, one IF filter is provided, and said IF filter is altered by comparison with IF filters used in DECT units and has half the bandwidth of the corresponding IF filters used in DECT units.

9. The improved radio telecommunication system according to claim 6, wherein the modified frequencies are generated from a standard DECT system clock.

10. The improved radio telecommunication system according to claim 6, which comprises a radio-frequency part provided for use in DECT units, and one IF filter provided besides a matching of a front end to the frequency range of the ISM band, being altered by comparison with DECT standards, said IF filter being altered by comparison with IF filters used in DECT units and having half the bandwidth of the corresponding IF filters used in DECT units.

11. The modified DECT system according to claim 1 implemented in cordless telephones.

12. In a digital multi-subscriber radio telecommunication system operated with frequency hopping technology and in the 2.4 GHz Industrial Scientific and Medical frequency band, a prescribed 20 dB channel bandwidth of a maximum of 1 MHz that must be adhered to, the improvement which comprises:

a modification to a Digital European Cordless Telecommunications (DECT) radio system, operated with TDMA/FDMA technology (Time Division Multiple Access/Frequency Division Multiple Access), having a data transfer rate reduced to half a data transfer rate prescribed by DECT standards (from about 1152 kbit/s to about 576 kbit/s), and radio-frequency parts of units used in the system being matched to an Industrial Scientific and Medical (ISM) frequency band, being altered by comparison with DECT standards.

13. The improved radio telecommunication system according to claim 12, wherein a channel spacing is likewise appropriately reduced by comparison with a channel spacing of 1728 kHz prescribed by DECT standards.

14. The improved radio telecommunication system according to claim 12, wherein time slots are combined to maintain a net data transfer rate.

15. The improved radio telecommunication system according to claim 12, wherein a channel spacing is reduced from a channel spacing of 1728 kHz prescribed in DECT standards to 864 kHz.

16. The improved radio telecommunication system according to claim 12, wherein two time slots are combined to maintain a net data transfer rate.

17. The improved radio telecommunication system according to claim 12, wherein the system utilizes transmitter modules and receiver modules provided for a conventional DECT system, and some of said modules are matched to the frequencies modified in comparison with DECT standards.

18. The improved radio telecommunication system according to claim 12 implemented in cordless telephones.

19. A digital multi-subscriber radio telecommunication system operating with frequency hopping technology and intended for use in the 2.4 GHz Industrial Scientific and Medical frequency band, having a prescribed 20 dB channel bandwidth of a maximum of 1 MHz that must be adhered to, the system comprising:

a modification to the known Digital European Cordless Telecommunications (DECT) radio system, operated with Time Division Multiple Access/Frequency Division Multiple Access (TDMA/FDMA) technology, having a data transfer rate reduced to half a prescribed DECT data transfer rate and provision for radio-frequency parts of units used in the system to be matched to an Industrial Scientific and Medical (ISM) frequency band, altered by comparison with the DECT standard;

DECT units each having transmitter modules and receiver modules, some of said DECT units being matched to the frequencies modified by comparison with the DECT standard; and a radio-frequency (RF) part provided for use in said DECT units, said RF part having just one IF filter altered by comparison with IF filters used in others of said DECT units and having half the bandwidth of corresponding DECT IF filters.

* * * * *